Feb. 8, 1944.  P. S. MORGAN  2,340,975
LIQUID MEASURING PUMP
Filed April 23, 1941  9 Sheets-Sheet 3

INVENTOR
Porter S. Morgan
BY
ATTORNEY

Feb. 8, 1944.  P. S. MORGAN  2,340,975
LIQUID MEASURING PUMP
Filed April 23, 1941    9 Sheets-Sheet 5

INVENTOR
Porter S. Morgan
BY Albert R. Henry
ATTORNEY

Feb. 8, 1944.  P. S. MORGAN  2,340,975
LIQUID MEASURING PUMP
Filed April 23, 1941   9 Sheets-Sheet 6

INVENTOR
Porter S. Morgan
BY
ATTORNEY

Feb. 8, 1944. P. S. MORGAN 2,340,975
LIQUID MEASURING PUMP
Filed April 23, 1941 9 Sheets-Sheet 8

INVENTOR
Porter S. Morgan
BY Albert R. Henry
ATTORNEY

Patented Feb. 8, 1944

2,340,975

UNITED STATES PATENT OFFICE 2,340,975

LIQUID MEASURING PUMP

Porter S. Morgan, Westport, Conn.

Application April 23, 1941, Serial No. 389,917

16 Claims. (Cl. 103—23)

This invention relates to a liquid measuring pump, and it has particular reference to the provision of a pump capable of delivering identical volumes of air-free liquid for each cycle of operation, so that the motion of the pump itself may be relied upon to measure accurately the total quantity of liquid.

The present invention is particularly applicable to the pumping and measuring of highly volatile liquids such as gasoline, which, when sold at retail, must be accurately measured to insure both the purchaser and vendor against loss. As of the time of this invention, the commonly accepted gasoline dispensing equipment includes a motor-driven pump for raising the gasoline from a reservoir, an air separator, a liquid flow meter, and a dispensing hose, through which the pump effluent flows. As the gasoline is often mixed with air, and since the air will affect the operation of the meter, the interposition of the separator is a practical necessity. The air-free gasoline, moving through the meter, produces a movement of a part thereof, and this motion in turn is transmitted to a counter or register to indicate the total quantity dispensed in any operation.

Long prior to the adoption of this standard equipment, it had been common to dispense less volatile petroleum products, such as coal oil, by means of a fairly simple form of piston-in-cylinder pump. It was assumed that since the piston moved a known distance in a cylinder of known size, each stroke of the piston resulted in the induction and expulsion of the same amount of liquid. Thus, it has been broadly proposed to use the motion of the pump shaft as a direct index to the volume delivered, and such "measuring" pumps even today may be used when the rate of operation is slow, the liquid quite high in boiling point, and the permissible tolerance in measurement fairly high.

This simple type of pump cannot, however, be employed in dispensing gasoline. One reason for this is the nature of the liquid itself. A high suction pressure on gasoline will cause vaporization in the suction line, and, as noted above, air bubbles frequently mix with the liquid. Another reason is found in the nature of the pumps heretofore available. While, theoretically, the pump may induct and deliver equal volumes per stroke, this is not absolutely true for ordinary pumps, and if the speed of operation be increased, as by driving with a motor instead of by hand, the variations in volume are pronounced. Both of these reasons have therefore led to the adoption of the above-described standard equipment, wherein no attempt is made to use the pump itself as a measuring device, and both an air separator and a flow meter are included in the discharge portion of the circuit.

The present invention contemplates a liquid pump which delivers substantially equal volumes of liquid per stroke or cycle of operation, and therefore a pump which can be employed for gasoline dispensing without the addition of the air separator and the flow meter; and which pump may, of course, be employed in many other applications and relationships.

In one aspect, the invention contemplates a novel combination of a liquid pump, driven from a source of power through the medium of a clutch operative only below a predetermined maximum torque, provided the pump is adequately supplied with liquid.

In another aspect, the invention involves the combination, with a liquid pump, of a gas or exhaust pump, coupled for operation through a clutch, the gas pump serving to prevent air or gas from entering the liquid pump, and the clutch operating to disconnect the liquid pump from the power source, if the gas pump is laboring under a heavy burden.

The invention, as herein described, also includes an improved form of exhaust pump, wherein the usual piston or vane is replaced by impervious diaphragms whose rapid oscillations impart a high capacity to a pump of relatively small size.

The invention also provides for a compact assembly of the various major elements of the general combination, wherein the gas pump, the clutch, a reducing gearing, and the main liquid pump are all encompassed in a generally cylindrical housing, adapted to serve as a mounting for the driving motor, and which needs only to be connected to the suction and discharge liquid lines, and the electric power line, to condition the unit for operative service.

Other features of the invention are more particularly concerned with the liquid pump itself. In general, the preferred pump is a multiple cylinder, double acting type, including four cylinders disposed in quadrature for operation from a common pump shaft, and with inlet and outlet valves actuated also from the pump shaft in proper timed relation to the motion of the pump. In the preferred embodiment of the invention, each cylinder receives pairs of diaphragms, thus providing dual cylinders in line, and pairs of aligned cylinders, intermediate which are located the valves for controlling the inlet and outlet ports.

This arrangement of the cylinders and valves permits of a very compact assembly, and a small unit size for the capacity of the pump. As the detailed description proceeds, it will moreover be observed that the inlets of the several cylinders are immersed in liquid, thereby further avoiding any opportunity for incondensible gas to enter the cylinders on the suction stroke, and thus assuring the delivery of equal amounts of liquid for each cycle of operation.

Numerous other objects and advantages of the invention, and the novel means whereby the same are attained, will be more readily apparent from the following detailed description of one practical embodiment of the principles thereof, illustrated in the accompanying drawings, wherein.

*General organization (Figs. 1 and 2)*

Figure 1:
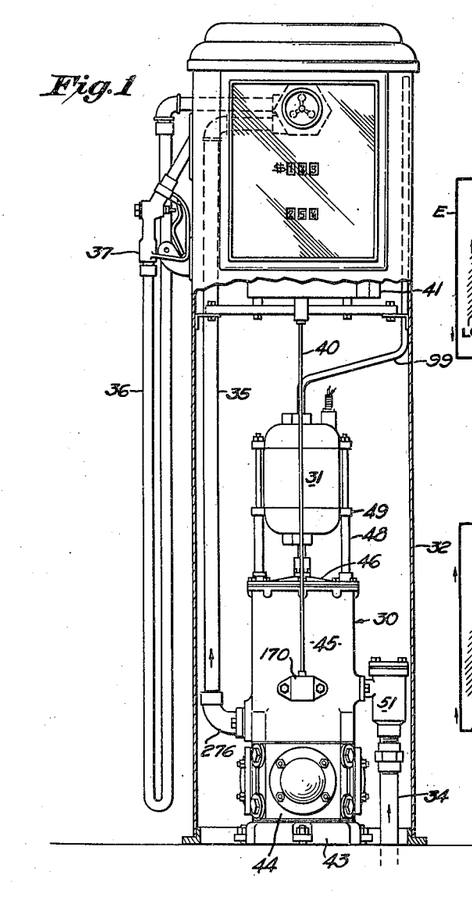
Fig. 1 is a view of a gasoline retail dispensing apparatus, a portion of the casing being broken away to show the measuring pump in elevation.

The measuring pump of the present invention, generally designated by the reference numeral 30, is shown in Fig. 1 installed in a gasoline dispensing apparatus. The pump 30 is driven by an electric motor 31, mounted on the top of the pump unit, and these parts are contained in an upright sheet metal casing 32, typifying the dispenser casings installed in the service station. Gasoline enters the pump 30 from an underground storage tank, not shown, through a suction pipe 34, and is discharged from the pump through a discharge pipe 35, for delivery to a dispensing hose 36 having a manually controlled valved nozzle 37 at its end.

A shaft 40, connected to the pump mechanism in a manner hereinafter described, extends upward from the pump 30, and it is connected to a counter or register 41, herein illustrated as being of the computing type. The operation is such that, when the pump delivers liquid through the discharge line 35, the shaft 40 is also operated, thereby actuating the register 41 to indicate the volume, and value, of the liquid dispensed. Liquid flowing through the pump is deaerated, and the separated incondensible gases flow to waste through a vent pipe 99.

Figure 10:
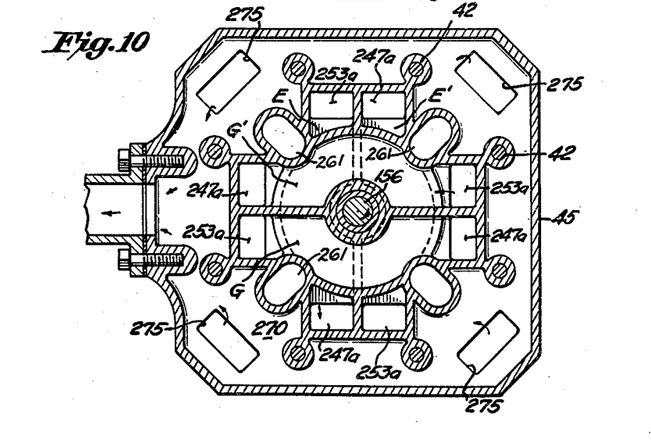
Fig. 10 is a section on the line 10—10 of Fig. 2, through a portion of the main casting, and showing the main inlet and outlet passages for liquid flowing through the pump.
Figure 11:
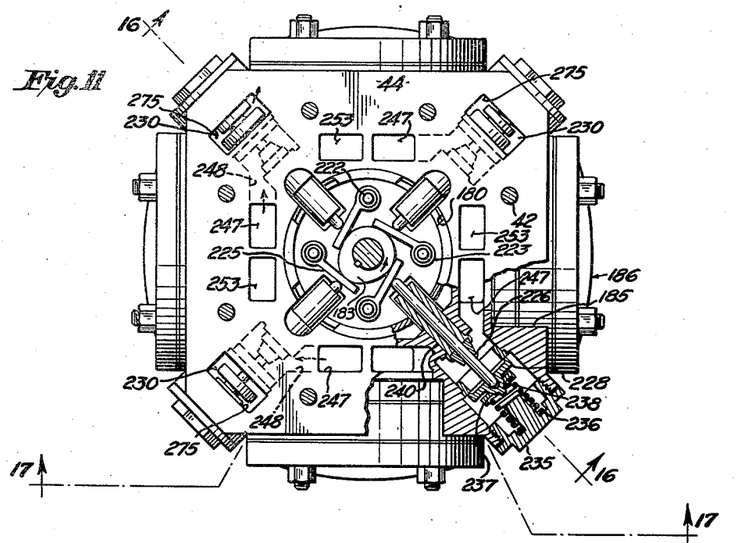
Fig. 11 is a section on the line 11—11 of Fig. 2, showing the location of the discharge valves for the several pump cylinders, and certain of the liquid passages.
Figure 14:
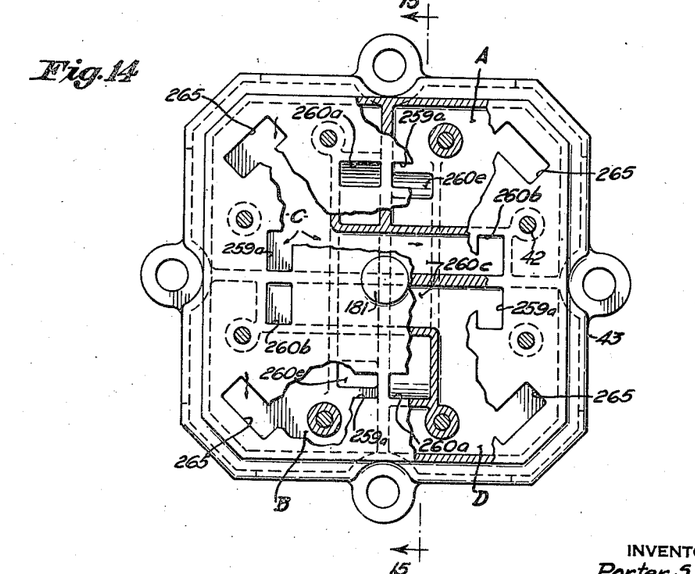
Fig. 14 is a section on the line 14—14 of Fig. 2, showing the base casting, with portions thereof broken away to show the inlet circuit arrangement therein.

The pump unit 30 includes three main sections, designated as a base casting 43, a cylinder block 44, and a separator casing 45, which are secured in superimposed and coaxial relation by internally located through bolts 42, shown in Figs. 10, 11, and 14. The top of the casing 45 is capped by a cover 46, whose outer surface is formed with slotted lugs 47 which receive the ends of vertical posts and bolts 48. The motor 31 is mounted on the upper ends of the posts by means of lugs 49 formed on the motor frame.

Figure 2:
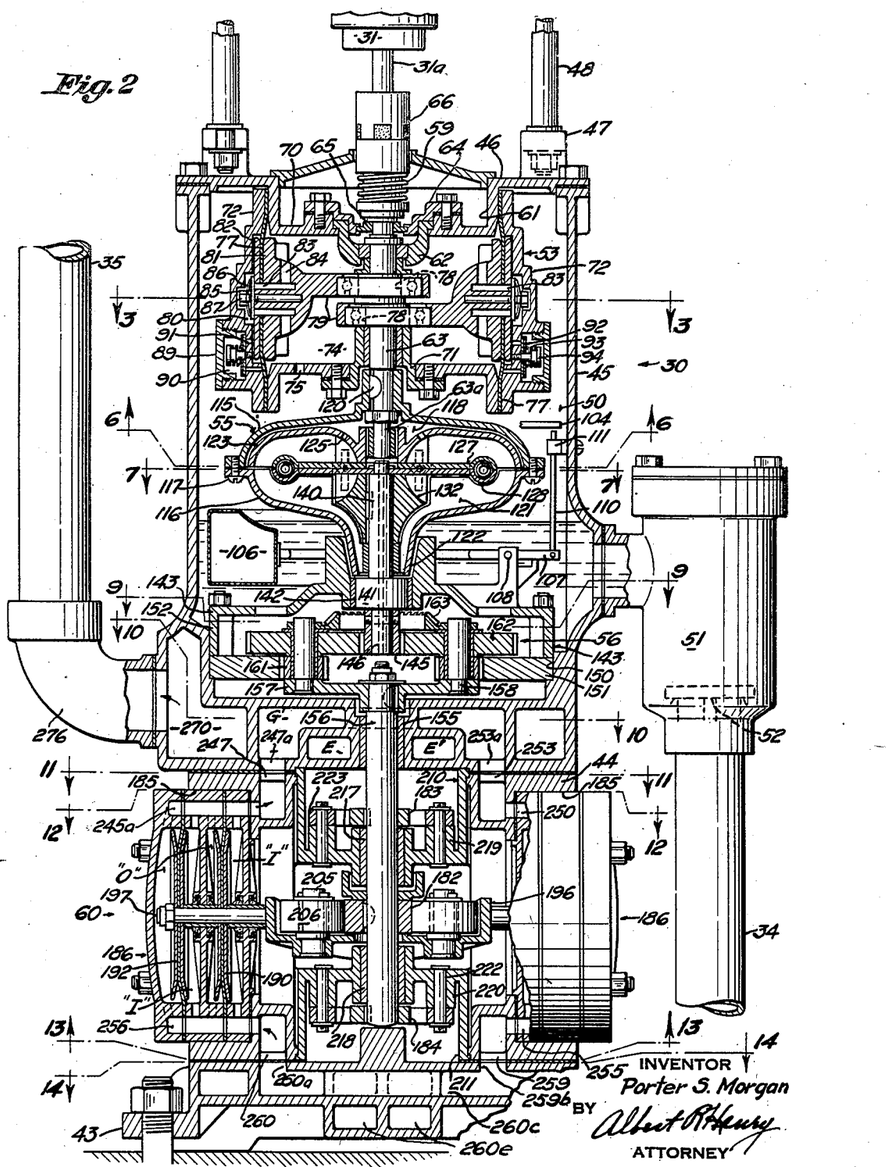
Fig. 2 is an enlarged vertical section of the measuring pump.

Referring now more particularly to Fig. 2, it will be observed that the composite casing structure of the pump 30 houses a number of elements. The interior of the upper casing 45 constitutes a separating chamber 50 for gasoline, which enters from the suction pipe 34 through an intermediate fitting 51, flowing past a built-in check valve 52 which prevents liquid in the chamber 50 from draining back to the storage tank when the apparatus is idle. The casing 45 also houses a gas exhaust pump 53, suspended from the cover plate 46; a hydraulic clutch or coupling 55; and a gear reduction train 56.

The underlying cylinder block 44 contains the elements of the liquid pump proper, generally designated by the numeral 60. The arrangement is such that liquid entering the chamber 50 is first freed of entrapped air, and is then permitted to flow down through the interior of the block 44, and certain passages in the base 43, for admission to the several pump cylinders. From the discharge side of the cylinders, the liquid flows through other passages, and enters the discharge pipe 35, which is connected to the pump casing by a fitting 276.

It will also be observed, from a consideration of Fig. 2, that the drive shaft 31a of the motor 31 operatively extends down through the cover 46, to operate the exhaust pump 53, and also to operate the liquid pump 60 by driving connections taken through the clutch 55 and the reduction gearing 56. It may here be noted that the counter drive shaft 40, shown in Fig. 1, is so connected to the reduction gearing that it will rotate when the gearing is operated to drive the liquid pump. Thus, when the liquid pump operates, the register also operates, and when the liquid pump is not driven, then the register cannot move.

The operation of the reduction gears, the counter drive, and the liquid pump, by power input from the motor 31, in turn is made dependent upon the operativeness of the clutch 55, and there are two conditions under which no motive power will be so transmitted by the running motor. One condition is when the chamber 50 contains less than a predetermined amount of liquid, and another condition is when the nozzle 37 is closed, thus producing a high head resistance. For the present purposes, the condition of low liquid level in the chamber 50 is synonymous with the presence of abnormal air volumes—the idea being that if there is not enough liquid in the casing to flood the pump cylinders, then the pump ought to stop operating, for otherwise some air might get in. Again, if the nozzle 37 is closed, then liquid cannot be dispensed, and again the pump and register should stop operating.

These conditions are satisfied in this invention by providing a slipping clutch, which is sensitive to the presence of liquid, and also to a predetermined head resistance. It will be seen that in such system, the common by-pass circuit of a positive displacement pump may be eliminated, and that the liquid pump itself also constitutes the flow meter. With this general outline of the plan of the apparatus and the major components, there will now be described in detail the various portions just referred to.

*The separator pump (Figs. 2–5, Sheets 2 and 3)*

The cover 46 of the separator casing 45 is formed with a central depressed portion 61 which carries an axial bearing member 62 for receiving a shaft 63 for the separator pump 53. The bearing member 62 is secured to the portion 61 by a cap 64, such cap having rigidly secured thereto a sealing member 65 which encircles the shaft 63. The upper portion of the shaft 63 is connected to the shaft 31a of the motor by a flexible coupling 66. An expansible seal 59 is secured to this portion of the shaft 63, and its free end rotatably contacts the sealing member 65 to provide a fluid-tight rotary joint.

The cover 46 is also formed with a horizontal cylindrical barrel 70 (Fig. 3) having a second bearing 71 for the shaft 63 fitted to its lower side (Fig. 2). The open ends of the barrel 70 are capped by heads 72 to provide an air inlet chamber 74 within the barrel 70. An inlet hole 75 establishes communication between the chamber 74 and the separating chamber 50. Clamped between the heads 72 and the ends of the barrel 70 are pump diaphragms 77, formed of a rubber substitute which is inert to gasoline.

Figures 3, 4, 5:
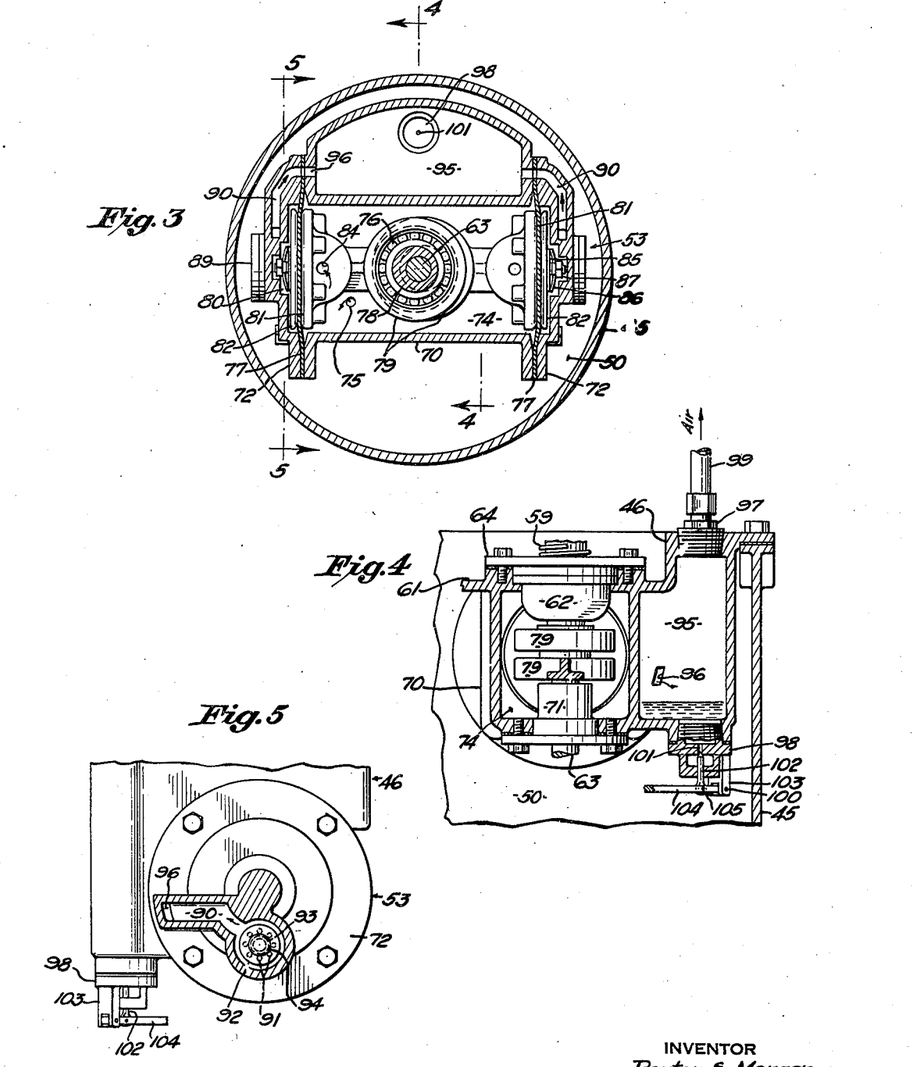
Fig. 3 is a section on the line 3—3 of Fig. 2, and it particularly shows the exhaust pump and exhaust condensing chamber.
Figs. 4 and 5 are sections on the lines 4—4 and 5—5 of Fig. 3, which further illustrate the exhaust pump.
Figure 6:
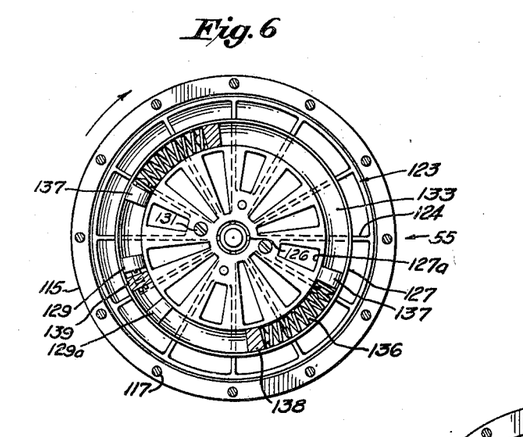
Figs. 6 and 7 are views taken along the lines 6—6 and 7—7 of Fig. 2, particularly to show the structure of the hydraulic clutch.
Figure 7:
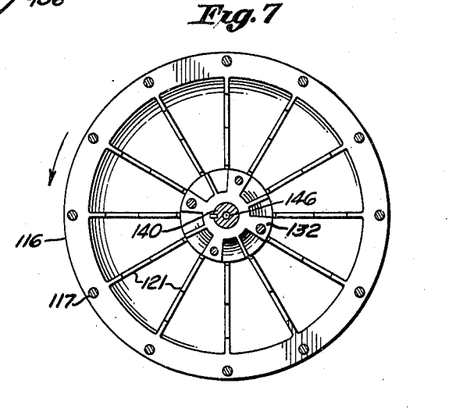
Figure 8:
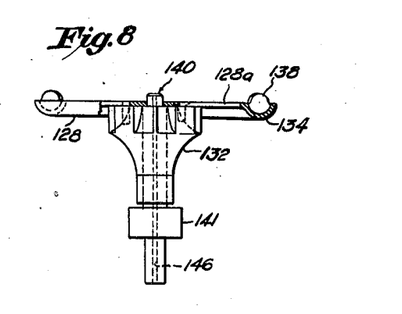
Fig. 8 is a side elevation of the lower shutter and the attached centrifugal hub of the clutch, portions of the shutter being broken away.

The pump shaft 63 is supplied with oppositely directed eccentric portions 78 which receive strap members 79 and interposed ball bearings 76. The strap members 79 extend in opposite directions, and their extremities are formed with squared faces 81, to each of which faces a diaphragm 77 is firmly secured by a clamping washer 82. The faces 81 each contain an annular inlet valve seat 83 (Fig. 2) which communicates with the chamber 74 through lateral holes 84 in the strap members 79. A disc valve 85 is retained on each seat 83 by a leaf spring 86, which spring is retained under compression by an adjusting screw 87 which extends through the disc valve 85 and into the underlying strap member 79. An outlet manifold 90 is formed within each head 72, and communication is established between each manifold and the interior chamber 80 of the heads 72 by outlet port groups 91 (Figs. 2 and 5). A plate valve 92 is disposed over each set of ports 91, and it is releasably retained in such position by a spring 93 through which an adjusting screw 94 extends into the adjacent wall of the head 72. A removable cap screw 89 in the wall of each manifold 90 permits access to the valves 92.

An enclosed condensing chamber 95 is formed in the cover 46 immediately adjacent the barrel portion 70 thereof (Figs. 3 and 4), and it communicates with the manifolds 90 through connecting passages 96. The chamber 95 receives fittings 97, 98, the former fitting receiving a standpipe 99 which extends upwardly to a high point in the dispenser casing 32 (Fig. 1). The lower fitting 98 contains a port 101 on which is seated a valve 102. The fitting 98 is formed with a depending slotted lug 103 which pivotally retains by a pin connection 100, one end of a lever 104. The lower end of the valve 102 is connected to the lever 104 by a pin 105. The valve 102 may be closed by operation of a float structure (Fig. 2) consisting of a float 106 located in the chamber 50 and attached to an arm 107, which arm is pivotally mounted in the casing, as indicated by the numeral 108. The free end of the arm carries a rod 110 which extends upward through a guide post 111 and is adapted, when the float drops, to engage the end of the lever 104, and thus to raise the valve 102 to its seated position.

It will now be apparent that as the motor 31 is energized, the diaphragms 77 will be rapidly reciprocated in opposed directions, and, on the inward strokes of the diaphragms, air will be drawn from the chamber 74 through the ports 83 and into the intermediate chambers 80, whence, on the next outward stroke of the diaphragms, the air is forced out through the ports 91, the manifold 90, and into the condensing chamber 95. The incondensible gases escape from the chamber 95 through the standpipe 99, while the condensates collect in the bottom of the chamber awaiting discharge back into the separator chamber 50 whenever the valve 102 is opened. During this operation, it will be observed that the opening and closing of the diaphragm valves 85 will be favorably influenced by inertia effects which tend to unseat the valves at the beginning of the inward strokes of the straps 79 to overcome the force exerted by the springs 86.

The gas exhaust pump is, of course, in communication with the separator chamber 50 through the port 75, and, as it exhausts gas from this chamber, a suction pressure condition is created, thus causing the gasoline to flow up through the suction pipe 34. When the liquid level in the chamber 50 reaches a satisfactory point, there is no need to continue the effective operation of the exhaust pump, and accordingly, the raising of the float 106 opens the port 101, thereby short-circuiting the separator pump. Gasoline continues to flow under the suction of the main pump, but upon the occurrence of loss of suction pressure, or the introduction of large gas volumes in the chamber 50, the port 101 is again closed, due to the dropping of the float 106, and the above described operation is repeated.

In practice, there will be some variation in the liquid level during normal running operation, and accordingly the float mechanism is proportioned to compensate for the permissible rise and fall of the liquid.

The torque-responsive clutch (Figs. 2, 6, 7, and 8, Sheets 2 and 4)

The clutch 55, shown in Fig. 2, is of the hydraulic type, and it has one member connected to the shaft 63 of the gas pump, and thus is directly driven by the motor 31, and another member which in turn is connected to the main liquid pump. The first named, or driving element comprises a casing 115 and an impeller 116 which are connected together at their rims by screws 117, thereby forming an enclosed centrifugal chamber 118. The upper casing 115 is formed with an axial boss which is secured to the shaft 63 by a key 120. The impeller 116 is internally formed with radially disposed arms or ribs 121 which follow the contour of the impeller and which terminate in a depending eye portion 122.

A driven element, or runner 123, is mounted within the chamber 118 for free rotary movement by a bushing interposed between its hub and an extension 63a of the shaft 63. This runner, similar to the impeller 116, is formed with internal ribs or arms 124. Holes 125 are formed near the center of the runner 123, to establish a restricted communication with the chamber 118, and the chamber 118 in turn communicates with the center of the assembly through holes 126 formed in the hub of the runner 123.

A pair of opposed shutters is mounted between the impeller 116 and the runner 123. The upper shutter 127 is connected to the runner 123 by screws 131, and the lower shutter 128 is similarly connected to a depending hub 132, positioned within the vanes 121 of the impeller 116. Each shutter is formed with radial slots 127a, 128a, which, in normal running operation, are in substantial alignment. Each shutter is also formed at its periphery with a semi-circular section, 133, 134, respectively, so that, when the shutters are superimposed, they define a torus-shaped compartment 135.

The compartment 135 contains a pair of compression springs 136, each of which is retained therein under a predetermined compression by a lug 137, formed in the section 133 of shutter 127, and a lug 138, formed in the section 134 of shutter 128. The section 133 also is formed with a pair of spaced lugs 129, 129a, while the section 134 is formed with a lug 139, adapted to be positioned between the lugs 129, 129a, when the parts are assembled. With this construction, it will be apparent (see Fig. 6) that if a force be applied to the runner 123, acting toward the lugs 138, such force is transmitted through the medium of the precompressed springs 136, thereby tending to cause the two parts to move in unison. If the lugs 138, and attached parts, be restrained from movement, then the lugs 137, and attached part (shutter 127 on runner 123) will further compress the springs 136, and moreover eventually bring the lug 139 into contact with the stop lug 129a. The first described position is that of the coupling while transmitting motion, and with the shutter slots 127a and 128a in alignment. The second described position misaligns the shutters to close the openings—a retrograde re-opening being prevented by the abutment of the lug 139 with the lug 129a—and this is the position of slippage above a predetermined torque.

The hub 132, to which is secured the driven shutter 128, is keyed to a stub shaft 140 which is formed with an enlarged portion 141, mounted in a bearing 142 at a point just below the eye 122 of the impeller 116. The bearing 142 is supported in a casing 143 for the gear reduction mechanism 56. The lower end of the shaft 140 terminates within this casing, and is reduced in diameter at its end to receive a sun gear 145. The shaft 140 is moreover formed with an axial hole 146, communicating with the passages 126, and thus providing a fluid communication from the centrifugal chamber 118 to the gear casing.

If there is insufficient liquid in the chamber 50, rotation of the motor shaft 31 will cause the casing 115 and attached parts to revolve, but there will be no driving impulse on the runner 123, and therefore the shaft 140 and gear 145 will not move. Liquid entering the chamber 50, under the suction created by the exhaust pump 53, gradually enters the eye 122, displacing air from the chamber 118 through the holes 125, 126, and 146, which then flows out of the system. The energy of the liquid developed by the rotation of the vanes 121 is transmitted to the arms of the runner 123, thus causing the runner to move, and thereby rotate the attached shaft 140 in the manner previously described. During this movement, the liquid recirculates to the impeller through the openings defined by the aligned shutter slots 127a and 128a. If, however, there should be too great a resistance to the rotation of the shaft 140, as would be generated by closing the nozzle of the dispensing hose, then the runner 123 will overtravel, closing the shutter openings, and blocking the recirculation of the energizing liquid.

When this occurs, the shaft 140 can no longer turn, since the hydraulic coupling has been broken. It will thus be seen that the clutch 55 is inoperative when there is no liquid for the main pump 60, and that it is also ineffective when the head pressure on the main pump reaches a predetermined value. This last value is controlled by suitable selection of the springs 136, whose rates are adjusted and balanced against the pressure developed in the discharge line 35 when the nozzle 37 is closed.

Figure 9:
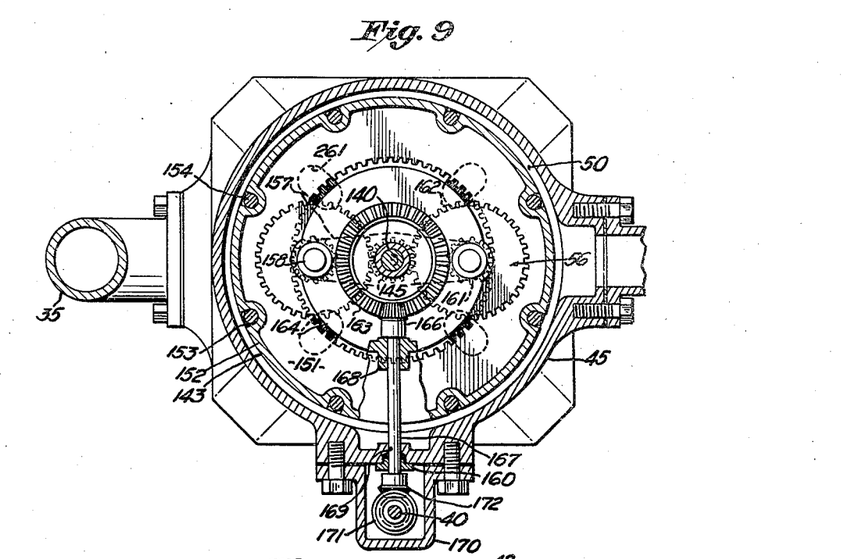
Fig. 9 is a section on the line 9—9 of Fig. 2, revealing the gear reduction mechanism and the countershaft for driving the volume register concurrently with the operation of the liquid pump.

The gear reduction drive (Figs. 2 and 9)

The lower portion of the chamber 50 is formed with an annular shoulder 150 to receive an internal gear 151. The gear casing 143 is formed with a peripheral flange 152 which rests on the gear 151, and with circumferentially spaced slots 153 which receive bolts 154 extending through suitable holes in the ring gear 151, thus securing and positioning the parts.

The bottom of the chamber 50 is provided with an axial bearing 155 for rotatably receiving the upper end of a liquid pump shaft 156, and which depends into the underlying cylinder block 46. The upper projecting end of the shaft 156 has keyed thereto a spider 157 whose arms are diametrically drilled to receive riveted vertical studs 158. Each stud rotatably receives a cluster gear comprising a pinion 161 meshing with the internal gear 151, and a planetary gear 162 which meshes with the sun gear 145 on the stub shaft 140. Counterclockwise rotation of the gear 145 will thus impart clockwise rotation to gears 162 and 161, with a resulting counterclockwise rotation of the spider 157 and connected pump shaft 156, and a speed reduction between shafts 140 and 156 determined by the relative diameters of the several gears. In the embodiment shown, it may be suggested that a twelve to one reduction has been effected, so that, with a normal motor speed of 1725 R. P. M., the pump shaft speed will be about 144 R. P. M.

The register 41 is also driven through the reduction gearing simultaneously with the movement of the pump shaft 156. A bevel gear 163 is formed with a large radial flange 164 provided with holes which fit over the upper ends of the studs 158, thus in effect connecting the gear 163 directly to the spider 157 and shaft 156. A meshing bevel gear 166 is mounted on a horizontal countershaft 167 which is supported in a bearing 168 formed in the gear casing 143, and an aligned bearing 169 located on the separator casing 45. Leakage is prevented by a suitable packing 160. This portion of the casing is capped by a gear housing 170, and, as will be noted from Fig. 1, the register drive shaft 40 also terminates in this housing.

The ends of the shafts 40 and 167 are provided with meshing bevel gears 171 and 172, and accordingly, when the pump shaft 156 rotates, the register shaft 40 is also rotated to operate the register 41, simultaneously and in determined speed relationship. Motion of the pump will therefore be reflected in the operation of the counter.

lines connecting the cylinders and valves indicate the fluid connections therebetween, and thus correspond to the passages which will be described later.

Figure 22:
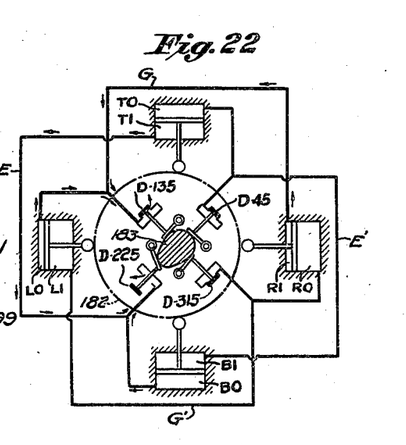
Figs. 22 and 23 are schematic and simplified diagrams, showing the relative location of the cylinders, and the position of the pistons and valves, for the outlet and inlet valves of the liquid pump, respectively.
Figure 23:
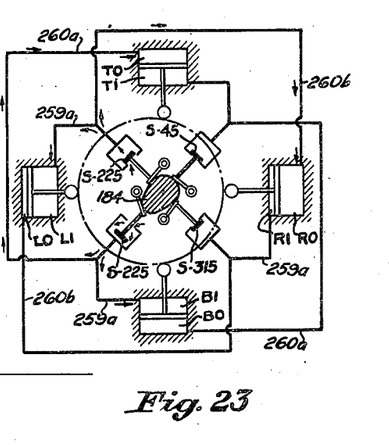

In Figs. 22 and 23, the four cylinders are identified by their relative location, thus: R for right hand; L for left hand; T for top; and B for bottom. The piston chambers within such cylinders are indicated by O for the outer cylinder chambers, and I for the inner cylinder chambers. Thus, LO and LI are the equivalent of the sectioned chambers shown in Fig. 2.

The suction and discharge valves are respectively indicated by the letters S and D, with a numerical subscript indicating their position in degrees around the circle.

Under these conditions, and with the further suggestion that suction and discharge valves in the same quadrant take identical positions, the following table defines the simultaneous positions and conditions of the piston chambers and valves when the horizontal pistons (as viewed in Figs. 22 and 23) are at the end of their left hand stroke.

| Cylinders | | Inlet valves (Fig. 23) | | Outlet valves (Fig. 22) | |
|---|---|---|---|---|---|
| Locale | Condition | No. | Condition | No. | Condition |
| LO RI | End of discharge. | S-315 | Closed, about to open. | D-135 | Open, about to close. |
| BO TI | Middle of discharge. | S-45 | Tightly closed. | D-225 | Wide open. |
| LI RO | End of intake. | S-135 | Open, about to close. | D-315 | Closed, about to open. |
| TO BI | Middle of intake. | S-225 | Wide open. | D-45 | Tightly closed. |

Liquid pump

It was noted, in connection with the general outline given above, that the general path of liquid flow throuogh the main pump 60 is down from the separator chamber 50, into the pump cylinders through passages in the base casting 43, and from there to the discharge line through other passages, some of which are located in the lower portion of the separator casing 45.

The pump about to be described in detail may be termed a quadruplex, double acting, positive displacement pump, wherein diaphragms are employed in lieu of sliding pistons, thereby eliminating the possibility of internal leakage losses. There are four pump cylinders, or barrels, located around a circle at ninety degree intervals, and there are four sets of inlet and outlet valves, also spaced at ninety degree intervals, and positioned in pairs, one above the other, at forty-five degrees from the cylinder axes. The pistons are driven, as has already been noted, by the main shaft 156, and the inlet and outlet valves are also actuated from the same shaft, by means of suitable cams.

To facilitate an understanding of the mechanical structure, diagrammatic layouts of the pump are shown in Figs. 22 and 23, Sheet 1. Each layout is made to the same scale, and for the same moment of operation, but Fig. 22 shows only the outlet valve circuit, while Fig. 23 shows only the inlet valve circuit. While, in the actual embodiment, there are two diaphragm pistons positioned in each barrel, single sliding pistons are represented in the simplified diagrams. The Thus, the valves in the 45-225 degree diagonal belong to the vertical or B and T cylinders, while the valves in the other diagonal are for the horizontal or R and L cylinders, or those appearing in Fig. 2, and the various passages are so devised as to connect these working chambers and inlet and outlet valves as the phase of operation requires.

Figure 16:
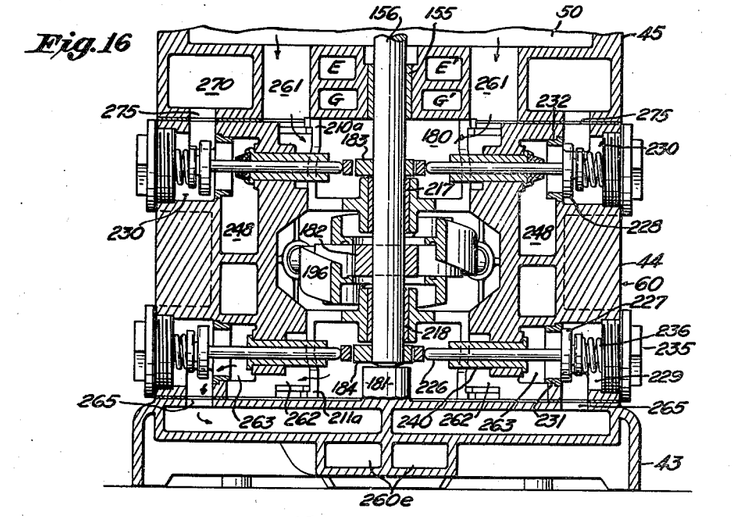
Fig. 16 is a diagonal section, taken on the line 16—16 of Fig. 11 or Fig. 13, further showing the valve arrangement.

The shaft 156 etxends through a cored central opening or crankcase portion 180 formed in the cylinder block 44, and is supported at its lower end on a thrust bearing 181 forming a part of the base casting 43. (Figs. 2 and 16.) A piston drive cam 182 is keyed to the shaft 156 at the mid-section of the block 44, and outlet and inlet valve cams 183, 184, are also keyed to the shaft above and below the drive cam 182. The cam 182 is of the constant diameter type, and the cams 183 and 184 are similar, and are positioned with their corresponding portions in vertical alignment. (See also, Figs. 11, 12, and 13.)

Figure 18:
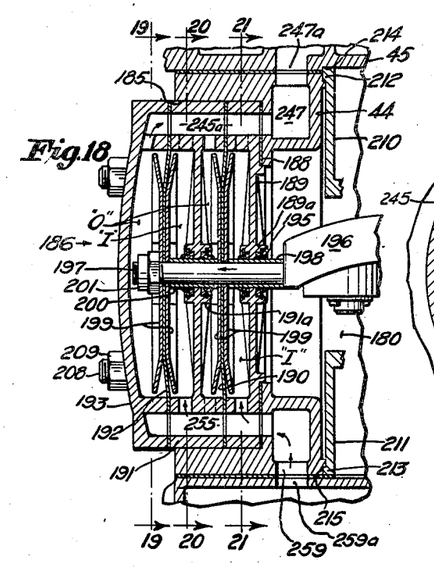
Fig. 18 is an enlarged fragmentary section through one of the pump cylinders, this section being taken on the line 18—18 of Fig. 19.
Figure 19:
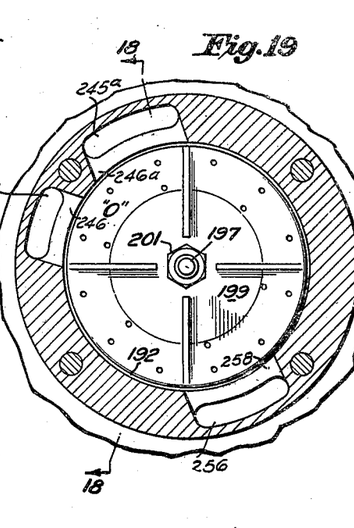
Figs. 19, 20, and 21 are sections on the lines 19—19, 20—20, and 21—21 of Fig. 18.
Figure 20:
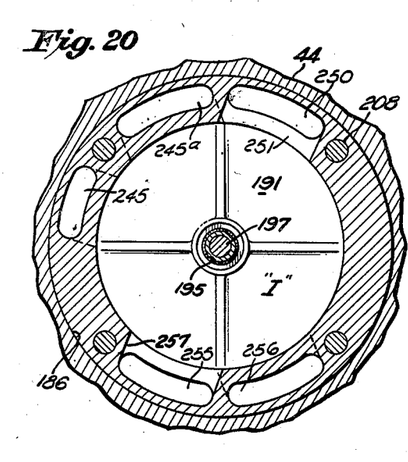
Figure 21:
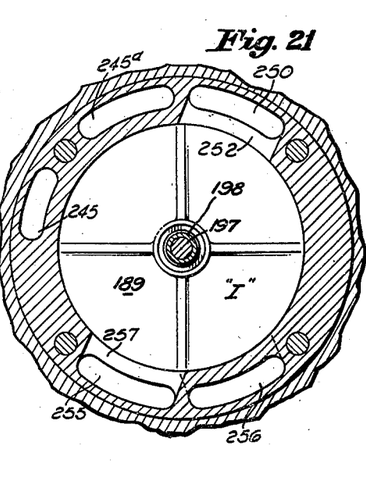

The block 44 is formed with four barrels 185 disposed in quadrature, each of which receives a double diaphragm piston structure generally designated by the numeral 186. As best shown in the enlarged section, Fig. 18, each structure consists of a plurality of cylindrical members inserted in the barrel 185, and including, in succession, a gasket 188, inner cylinder plate 189, inner diaphragm 190, central cylinder plate 191, outer diaphragm 192, and cylinder head 193.

Figure 12:
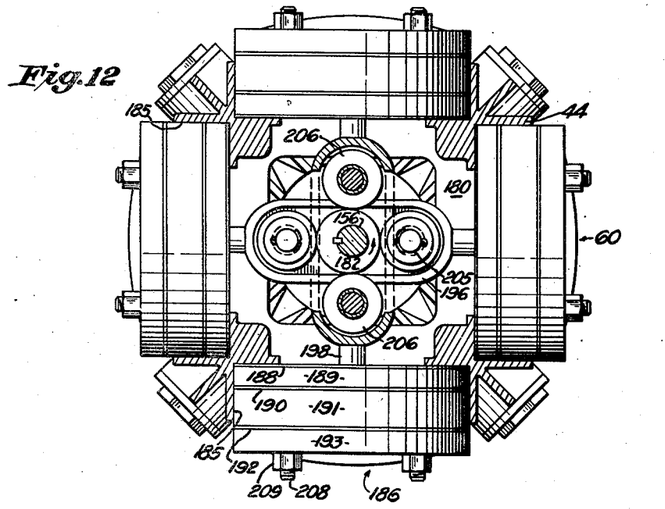
Fig. 12 is a section on the line 12—12 of Fig. 2, showing the yokes and cam drive for the pump pistons.

The cylinder plates 189 and 191 are formed with central hubs 189a and 191a, which provide for slide bearings 195. A pair of crossing yokes 196, which are operated by the cam 182, are each prcvided with oppositely extending piston rods 197. (Fig. 12.) Each rod 197 is successively provided with a spacer bushing 198, a pair of diaphragm plates 199 which engage the opposite faces of a diaphragm 190, a second bushing 200, and a second set of diaphragm plates for the outer diaphragm 192.

It will thus be seen that the fixed bushings 198 and 200 are slidably guided in the bearings 195 of the fixed cylinder plates 189 and 191, and the movable piston portion of the assembly is rigidly assembled on the rod 197 by means of the nut 201 on the outer end thereof. The fixed portions of the piston assembly are held in the block 44 by means of studs 208, which extend through the peripheral portions of the plates 189, 191, and 193, and the interposed diaphragms 190 and 192, and which receive clamping nuts 209 on their outer ends. Each piston assembly therefore includes four working chambers, one on each side of each diaphragm, and which operate together in pairs.

Figure 17:
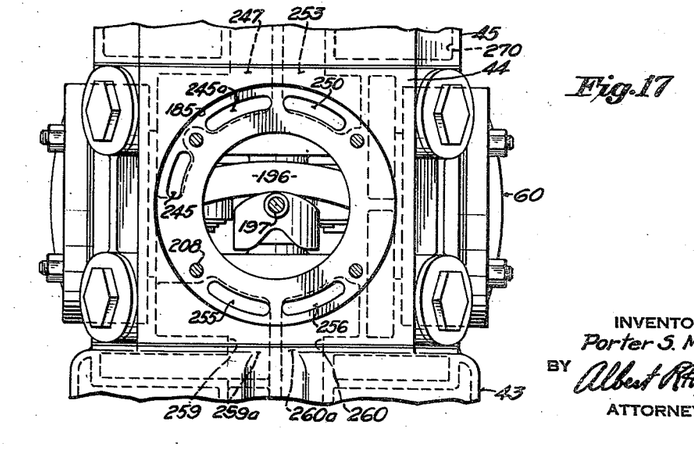
Fig. 17 is an end view of the cylinder block, taken on the line 17—17 of Fig. 11.

Each of the yokes 196 is provided with a pair of spaced vertical studs 205, upon which are rotatably mounted cam follower rolls 206 (see Fig. 12) which are constantly engaged by the cam 182. The yokes reciprocate at right angles to each other, and are cut away or are bowed at the mid-portions for mutual clearance, although the rolls 206 are in the same plane—a detail further shown in Figs. 16 and 17.

The valve structure includes upper and lower cylindrical bearing brackets 210 and 211 (Figs. 2, 16, and 18) which are positioned at each end of the crankcase portion 180 of the block 44. Each bracket is formed with slots 210a, 211a, to permit free flow of liquid. The brackets are formed with flanged ends 212 and 213, respectively, which engage complementary shoulders 214 and 215 formed in the block 44. This connection serves to retain the brackets against axial displacement when the base 43, block 44, and casing 45 are pulled together by the through bolts 42.

The brackets 210 and 211 are formed with axial bearings 217, 218 for the pump shaft 156, and also with integral spaced bosses 219, 220, respectively, which carry vertical pins 222. A tappet 223 is rotatably mounted on each pin 222—each tappet being formed with a projecting finger 225 which rides on the cam 183 or 184, as the case may be. That is to say, the tappet structure is alike for both inlet and outlet valves, and there are four tappets actuated by each cam, or eight in all.

Figure 13:
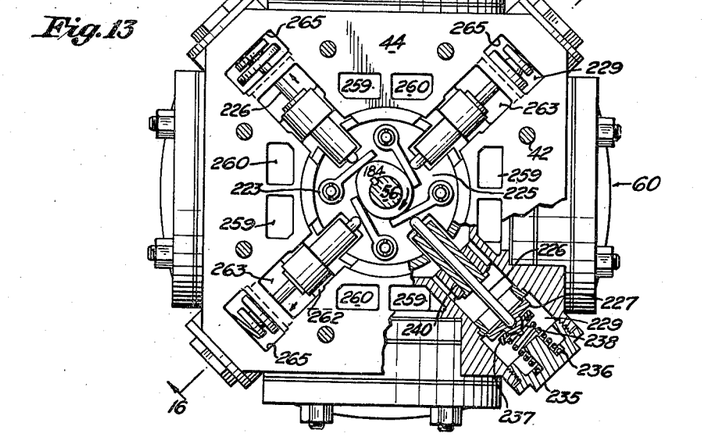
Fig. 13 is a section on the line 13—13 of Fig. 2, showing the location of the inlet valves.

Likewise, the structure of the inlet and outlet valves is the same (see Figs. 11, 13, and 16). Each assembly comprises a push rod 226 whose inner end is contacted by a finger 225, and which rod is free to reciprocate in a slide bearing 240 inserted in a suitable hole formed at the corner of the block 44. The outer ends of the rods are connected to circular valve bodies—the inlet valves being shown in Fig. 13, and designated by the numeral 227, and the outlet valves 228 being shown in Fig. 11. These valves are located in inlet and outlet chambers 229 and 230, respectively, and close against inserted seats 231, 232. Access to each valve chamber is had through a removable threaded plug 235, which internally forms an abutment for one end of a valve spring 236, whose opposite end engages a spring retainer 237, which encircles, and is pivotally movable upon, a spherical projection 238 formed on the valve body. The springs therefore urge the valves to closed position—the ball and socket connection enabling the valves to seat firmly—while the push rods 226 open the valves against the spring pressure when forced outward by the cam and finger actuation.

There is now to be considered the passage arrangement for the flow of liquid into the suction chambers and its discharge from the pressure chambers of the pump. Referring first to Figs. 18 to 21, it will be seen that the components of each cylinder assembly are formed with apertures which align themselves to form outlet and inlet ducts, as follows: Referring first to the upper left hand quadrant of the sectional views, the head 193 and the plates 189 and 191 are provided with dual exhaust ports 245, 245a, which are in fluid communication with the outer chambers O through slots 246, 246a, respectively. These passages extend longitudinally of the barrel and into the cylinder block 44, where they terminate in a common riser 247.

The riser 247 also communicates with a branch passage 248 (Fig. 11), which extends to the discharge valve 228. The upper right hand quadrant of each barrel assembly is also formed with a horizontal duct 250 communicating with the inner chambers I through slots 251, 252, respectively formed in the plates 191 and 189. The duct 250 terminates in a riser 253, which is parallel to but independent of the riser 247, and the riser 253 in turn also communicates with the discharge valves located in another quadrant. Thus, when the outer chambers are pressure chambers, the discharged liquid flows through ducts 245 and 245a into riser 247, thence through passage 248 past the associated valve 228, which must then be in open position; when the inner chambers are pressure chambers, the flow is through port 250, riser 253, and associated valve 228—the liquid flowing past the valves thereafter being transmitted to a common outlet manifold, as later described.

The lower left and right hand quadrants of each cylinder assembly are respectively formed with aligned apertures 255 and 256, which respectively constitute inlet ports for the chambers I and O. The inlet port 255 communicates with the inner chambers I through slots 257, while the port 256 communicates with the outer chambers O through slots 258. Each of these ports terminates in a riser 259, 260, respectively, formed in the block 44, which extend in parallel relation to each other down to the lower portion of the block.

Liquid is admitted to the inlet ports in this fashion: Referring to Figs. 10 and 16, it will be seen that the base of the overlying separating casting 45 is formed with four oval passages 261 which connect the chamber 50 with the crankcase 180, communication being effected through the slotted portion 210a and 211a of the brackets 210 and 211. The gas-free liquid flows laterally into passages 262 leading from the bottom of the crankcase 180, and into the four chambers 263 which are respectively located on the suction side of the several inlet valves 227 (see also Fig. 13). Liquid passing the valves flows into the valve chambers 229, which are in communication with chambers formed in the base casting 43 through composite ports 265.

Figure 15:
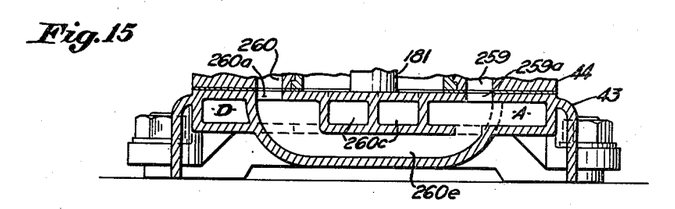
Fig. 15 is a section on the line 15—15 of Fig. 14.

Referring now to Figs. 14 and 15, it will be noted that the base casting 43 is cored to form four generally L-shaped chambers, A, B, C, and D, located in pairs with their long legs back to back, and with two long legs being offset so that they underlie the long legs of the other pair. Each such chamber is supplied with liquid through one of the ports 265. An outlet port 259a is formed at the junction of the two legs of each chamber, and this port is in communication with the riser 259 (Fig. 13) leading to the inner diaphragm chambers I.

The chambers A and D (compare Fig. 15) have underlying long legs or cored passages 260e which terminate at their ends in openings 260a that align with the risers 260 and lead to the outer pump chambers O through the longitudinal ports 256. The chambers B and C are also formed with long legs 260c terminating in openings 260b and which in turn align with their associated passages 260.

Thus, each admission chamber A, B, C, D, supplies a pair of O cylinder chambers and a pair of I cylinder chambers, which, at the same instant, are at the same stage or condition of operation. Each communicates with an adjacent inlet port and with a remote inlet port—the adjacent cylinder port being fed through the passage 259a, while the remote port is fed through the passage 260a or 260b, as the case may be. The connections for the adjacent and remote cylinders are effected through the passages 260c for the T and B cylinders of Fig. 23; while the connections for the R and L cylinders are similarly effected through the passages 260e.

Accordingly, whenever an inlet valve is opened by the operation of its cam 184, liquid flows past the valve to replace as much liquid, contained in one of the chambers and related passages, as is required to fill the pump chambers then on their intake phase of operation.

As previously noted, pressure liquid flows out of the pump cylinders through the risers 247 and 253, the riser 247 being adjacent an outlet valve 228 and in communication therewith through the passage 248, while the riser 253 is remote from the same valve. Here again (compare Fig. 22 and see Figs. 10, 11, and 16) a cross-over connection is effected, in order to bring each riser 253 in communication with a remotely located outlet valve. Noting particularly Fig. 10, it will be seen that the lower portion of the separator casing 45 contains an integral cruciform cored portion defining crossing pairs of ducts E, E', and G, G'. Each duct terminates at its ends in depending passages 247a and 253a which respectively communicate with a riser 247 and a riser 253. Simultaneously discharging pump chambers are thus connected to supply liquid to the associated outlet valve 228 through the passage 248 adjacent the riser 247.

Liquid passing the valve 228 flows into the outlet chamber 230 and into an associated duct 275 formed in the top of the block 44 and the bottom of the casing 45. These four ducts 275 discharge into a common outlet chamber 270, also formed in the lower portion of the casing 45 and encircling the passages E and G. The effluent from this chamber discharges into the line 35 through a connecting fitting 276.

For a summation of the flow path through the liquid pump 60—the condition of the operating cycle being as shown in Figs. 22 and 23—it will now appear that liquid flows down from separator chamber 50 through the oval passages 261 into the crankcase 180, thence into the four supply chambers A, B, C, and D, which are always flooded during operation. Inlet valves S—135 and S—225 being then open, liquid flows into cylinder LI through riser 259a of chamber C, and through riser 260b to cylinder RO, admission being effected through the associated ports 255 and 256. Liquid also flows from chamber B through its openings 259a and 260a to cylinders BI and TO, and in this case will continue so to flow for a full additional ninety degrees of operation. Inlet valves S—315 and S—45 being then closed, no liquid is supplied at this time to the remaining pump chambers, which are then on their discharge strokes.

Liquid emerging from the LO cylinder flows, via riser 247 and passage 248, past valve D—135, into its chamber 230 and through riser 275 into discharge manifold 270. Simultaneously, chamber RI discharges through this valve through the overhead duct G. In like fashion, valve D—225 being wide open, chamber BO discharges therethrough, and chamber TI supplies liquid thereto through the cored passage E.

*General operation*

Inasmuch as the mode of operation of the various components has been stated in connection with an explanation of the structure, a short review of the general operation will suffice. Assuming the pump to have been installed in a gasoline service station, or other location, the initial operation of the motor 30 will drive the gas pump 53, but not the liquid pump 60, for the reason that, until the chamber 50 is flooded with liquid, the clutch 55 is ineffective to transmit torque.

As the pump 53 operates, air in the system is exhausted through the vent 99—the low position of the float 106 causing the link 110 to lift, thereby raising the lever 104 and holding the valve 102 against its seat.

The lowering of pressure in the casing 45 causes liquid to rise in the suction line 34, opening the check valve 52 and accordingly flooding the chamber 50 with liquid. Air entrained in the liquid separates by gravity and under the influence of the reduced pressure, and it, with some gasoline vapor, is also exhausted by the pump 53—the gasoline vapors recondensing in the pump and collecting in the chamber 95. The liquid now reaches the level shown in Fig. 2, flooding the crankcase and the several inlet chambers A, B, C, and D. At the same time, liquid enters the rotating eye 122 of the coupling 55, and, as the impeller 121 is filled with liquid, it acts as a centrifugal pump, discharging liquid against the arms 124 of the runner 123.

The kinetic energy of this liquid is expended in rotating the runner 124—thus causing the runner and its attached shaft 140 to rotate at the same speed, less the differential due to natural slippage. Spent liquid returns to the impeller 121 by flowing through the aligned openings of the shutters 127 and 128. The rotation of the shaft 140 causes rotation of the pump shaft 156, through the gear train 56, thereby driving the liquid pump in the manner above described, and simultaneously operating the register 41 through the countershaft 40.

As long as the outlet line is open, and the motor is running, liquid will thus be simultaneously pumped and measured. Two conditions may arise, however, to interrupt this action. If the nozzle 37 is closed, the discharge line is blocked, and immediately a high head pressure is met by the discharging liquid. This is just about the same as putting a brake on the shaft 156—the torque which would be required to turn the shaft is tremendous—and further dynamic coupling is then forestalled.

Such slippage results in the closing of the shutters, thus in turn blocking the outlet for the impeller 121, and preventing the further conversion of its kinetic energy into driving energy. As noted above, the loading of the springs 136 is such that this slippage occurs at a torque value which safeguards the liquid pump from injurious strains, but permits operation while the nozzle 37 is wholly or partially open.

During operation, or during periods between dispensing operations, the liquid level in the chamber 50 may drop. When this occurs, the float 106 drops, closing the valve 102, and thus closing the "by-pass" for the gas pump 53. The gas pump then resumes its active duty of evacuating the air whenever the motor 30 is energized. Again, a condition of a dry tank might be encountered, and the pump 60 would continue to run until the liquid level fell below the eye 122. No torque would then be transmitted to the shaft 156, and hence the register 41 and pump 60 would both stop moving, and could not be made to move until the condition was corrected.

It will thus be seen that the present invention provides a liquid pump which can be employed in simultaneously pumping and measuring liquid, and protecting the liquid so measured from the inclusion of air or other incondensible gases. Obviously, the principles of the invention may be utilized with various forms and designs of its parts, and hence the foregoing description of the best embodiment now known to me is intended to exemplify, rather than to limit, such principles. It is intended that the invention should be considered as embracing all such variations and modifications as are encompassed within the scope of the following claims.

I claim:

1. In a liquid dispensing apparatus, the combination with a source of liquid supply, of a liquid pump, a separating chamber interposed between the supply and the inlet side of the pump, a discharge line connected to the discharge side of the pump, a pump shaft and a motor shaft extending into the chamber, a motor connected to the motor shaft, a coupling for interconnecting the pump shaft and the motor shaft, and means responsive to a predetermined low level condition of liquid in said chamber, and to a high pressure condition in the discharge line, for rendering said coupling ineffective.

2. Liquid dispensing apparatus comprising a casing including a liquid pump, an inlet opening formed in the casing above the liquid pump, a discharge line extending from the pump, a motor, a gas exhaust pump in the upper portion of the casing, a driving connection between the motor and the gas exhaust pump, a coupling operative only when the liquid pump is supplied with and is discharging liquid for connecting the motor to the liquid pump, and a register drive shaft actuated through the coupling only when the liquid pump is pumping liquid.

3. In a liquid dispensing apparatus in which there is, in combination with a source of liquid supply, a liquid pump, a separator casing on the inlet side of the pump, and a gas exhaust pump, a condensing chamber into which effluent from the gas exhaust pump discharges, a vent line extending from the condensing chamber, and a valved drain for returning condensate to the separating chamber, a float in the separating chamber whose position is controlled by the liquid level in the separating chamber, and means extending from the float to the drain valve for opening said valve when said level reaches a predetermined high point, thereby short-circuiting the gas exhaust pump to prevent further development of suction pressure in the separator chamber by the exhaust pump and the concurrent rise of the liquid level therein.

4. Liquid dispensing apparatus comprising a casing having a liquid inlet opening formed at the side thereof, a positive displacement liquid pump disposed below the casing and having an inlet in fluid communication therewith, a discharge passage extending from the liquid pump for connection to an exterior discharge line, a liquid pump shaft extending upward into the casing, a motor mounted on the casing and having a drive shaft operatively extending thereinto, a gas exhaust pump connected to said drive shaft, a float means in the casing for short-circuiting the gas exhaust pump when the liquid in said casing reaches a predetermined level, a clutch for interconnecting the drive shaft and the liquid pump shaft, said interconnection including reducing gearing, a counter drive shaft extending from the casing and being driven by said gearing concurrently with the liquid pump shaft, said clutch and reducing gearing being rendered inoperative to drive said liquid pump shaft against a predetermined discharge pressure.

5. Liquid dispensing apparatus comprising, in combination with a source of liquid supply, a separator casing connected to said source, a liquid pump having an inlet in fluid communication with the casing, a motor for driving the liquid pump, said motor having a shaft operatively extending into the casing, said pump also having a shaft operatively extending into the casing, a hydraulic coupling mechanically coupling the pump shaft and the motor shaft, said coupling having a liquid inlet disposed at a relatively low point in the casing but above the inlet for the liquid pump, said coupling also being formed with means to effect the dynamic disconnection thereof upon the imposition of a predetermined resistance to the rotation of the liquid pump shaft, whereby, upon either a diminution of liquid in the casing below a predetermined amount or the occurrence of predetermined resistance to the rotation of the pump shaft, said coupling dynamically fails but is mechanically preserved to restore the driving connection upon the removal of the causes of failure.

6. Liquid dispensing apparatus comprising, in combination with a source of liquid supply, a separator casing connected to said source, a liquid pump having an inlet in fluid communication with the casing, a motor having a shaft operatively extending into the casing, a shaft for the liquid pump also extending into the casing, a hydraulic clutch mechanically connecting the shafts, said clutch having a liquid inlet adapted to be submerged in liquid flowing into the casing from the source of supply, a float in the casing responsive to the level of liquid therein, and means in the casing operable by the float for limiting the suction pressure in the casing and thereby the high liquid level to a level below the upper portions of the hydraulic clutch.

7. Liquid dispensing apparatus comprising a sectional casing including a chamber at the upper portion thereof, a gas exhaust pump mounted within the upper portion, said gas exhaust pump having an inlet port in communication with said chamber and an outlet port in communication with the atmosphere, a liquid inlet port formed in said upper portion below said gas exhaust pump, a liquid pump disposed in a lower section of the casing, said liquid pump having an inlet in communication with said chamber, a driving connection from the gas exhaust pump to the liquid pump, said driving connection including a clutch having driving and driven members, a counter drive connected to the driven member and said pump, whereby the counter drive will operate when said driven clutch member and said pump are operated, a discharge line for the liquid pump, and means associated with said clutch for forestalling the transmission of torque from the driving member to the driven member upon either a diminution of liquid in the chamber or the blocking of the discharge line of the liquid pump.

8. In liquid dispensing apparatus, the combination with a liquid pump of a chamber mounted above said pump and in fluid communication with the inlet thereof, of a driving motor mounted above said chamber, and a driving connection extending through said chamber from the motor to the liquid pump, said driving connection including a hydraulic clutch having a liquid inlet disposed at a low point in said chamber and means for interrupting the transmission of torque therethrough when the load imposed by said pump reaches a predetermined value, whereby said clutch and said driving connection will fail upon either the occurrence of predetermined resistance to movement of the liquid pump or the diminution of the liquid level in said chamber below the inlet of said clutch.

9. In a liquid dispensing apparatus of the type including a liquid pump, a chamber on the inlet side of the pump and in fluid communication with the inlet of the liquid pump and a source of liquid supply, and a gas exhaust pump disposed in the chamber, said gas exhaust pump having a shaft and a pair of working chambers for the induction and discharge of fluid contained within the chamber, and impervious diaphragms closing said chambers and operable by said shaft.

10. In a liquid dispensing apparatus of the type including a liquid pump, a separating chamber in fluid communication with the liquid pump, and a gas exhaust pump having its inlet connected to said separating chamber, said gas exhaust pump being mounted in said chamber and comprising a barrel having end walls partially defining working chambers, flexible diaphragms mounted in the barrel adjacent said walls and cooperating therewith to define expansible working chambers, a shaft and connecting rods extending from the shaft to each of said diaphragms, an inlet valve mounted on each connecting rod for admitting fluid through the barrel into the working chamber, and a discharge valve mounted in the end wall of each chamber.

11. In a liquid dispensing apparatus including a liquid pump adapted to be supplied from an extraneous source and a motor for driving said pump, a hydraulic clutch for connecting the motor to the pump, said clutch including an impeller driven by the motor, a runner adapted to be driven by the kinetic energy of liquid discharged by the impeller, and a pump driving member adapted to be driven by the runner, port means interposed between the runner and the pump driving member, and means responsive to the imposition of a predetermined resistance on the liquid pump for causing movement of the runner relative to the pump driving member to close said port means.

12. In a liquid dispensing apparatus having a liquid pump, a motor therefor, and a hydraulic coupling for connecting the motor to the pump, a liquid receiving chamber for containing the coupling, said coupling including a rotary impeller connected to the motor, an inlet eye for the impeller, said eye being so positioned within the chamber as to be normally submerged in the liquid received therein, a runner adapted to be driven by the energy of the liquid discharged from the impeller, said runner being formed with ports for returning liquid to the impeller, a driven member formed with ports and mounted within the impeller, a driving connection from the driven member to the liquid pump, and a resilient connection between the runner and the driven member, said ports being so positioned as to be aligned when the runner and driven member are concurrently rotated, and to be misaligned when the resistance to movement of the driven member imposes more than a predetermined compressive load on said resilient connection.

13. In a liquid dispensing apparatus, a liquid pump comprising a cylinder block, a plurality of radially disposed cylinders in the block, a liquid inlet port formed at the top of the block, communicating ports formed at the bottom of the block for admitting liquid to a plurality of points in each cylinder, inlet valves positioned in the block intermediate the cylinders, outlet ports formed at a plurality of points in each cylinder, outlet valves positioned in the block above the inlet valves for controlling the passage of fluid through the outlet ports, a plurality of piston members positioned in each cylinder and intermediate both inlet and outlet ports therein, a pump shaft, means for driving the piston members and for actuating the valves through the pump shaft, and cross passages from the inlet and outlet ports of one cylinder to the inlet and outlet ports of another cylinder communicating with the valves to provide working chambers in different cylinders subject to the same condition of operation.

14. In a liquid dispensing apparatus, a liquid pump comprising a cylinder block formed with radially disposed cylinders, flexible diaphragms mounted in the cylinders to divide them into multiple working chambers, inlet and outlet ports for each chamber, a plurality of inlet valves mounted in the block intermediate the cylinders, passageways for admitting liquid through the valves to a chamber in an adjacent cylinder and to a chamber in a remote cylinder, a plurality of outlet valves mounted intermediate the cylinders, other passageways for discharging liquid from an adjacent working chamber and a remote working chamber past each of said valves, a pump shaft, and means operable by the pump shaft for reciprocating the diaphragms and actuating the valves in timed sequential order.

15. In a liquid dispensing apparatus, a separator casing normally containing a body of liquid and a volume of gas, a source of liquid to be dispensed, a hydraulic connection from said source to the casing to introduce liquid into the casing, a liquid pump having an inlet connected to the casing to receive the liquid therein and an outlet connected to a closable discharge line, a gas exhaust pump having an inlet connected to the casing to remove the gas volume therefrom, a power source, a driving connection from the power source to the liquid pump, said driving connection including and extending through a clutch, means for effecting the engagement of said clutch only when the liquid pump is receiving liquid from the separator casing and is discharging liquid through the closable discharge line, and a driving connection from the power source to the gas exhaust pump for operating the gas exhaust pump irrespective of the engagement or disengagement of the clutch.

16. In a liquid dispensing apparatus for withdrawing liquid from a supply source for delivery through a closable nozzle, a liquid pump having an inlet connected to the source and an outlet connected to the nozzle, a separator casing interposed between the source and the pump inlet wherein gases contained in the liquid may be separated, said pump inlet being disposed at a relatively low point in said casing so that air-free liquid is supplied to the pump, a gas exhaust pump connected to the casing at a relatively high point therein, a motor for driving the gas exhaust pump and the liquid pump, a driving connection directly extending from the motor to the gas exhaust pump for operating the gas exhaust pump concurrently with the motor, other driving connection means for connecting the motor to the liquid pump, said last named other driving connection means including an engageable and disengageable clutch, means associated with the clutch and casing for causing the disengagement of the clutch when the liquid level in the casing falls below a predetermined level, and other means associated with the clutch for causing the disengagement thereof whenever the nozzle is fully closed.

PORTER S. MORGAN.